United States Patent
Boulton

(10) Patent No.: US 11,250,127 B2
(45) Date of Patent: Feb. 15, 2022

(54) BINARY SOFTWARE COMPOSITION ANALYSIS

(71) Applicant: BlackBerry Limited, Waterloo (CA)

(72) Inventor: Adam John Boulton, Wirral (GB)

(73) Assignee: Blackberry Limited, Waterloo (CA)

( * ) Notice: Subject to any disclaimer, the term of this patent is extended or adjusted under 35 U.S.C. 154(b) by 405 days.

(21) Appl. No.: 16/129,321

(22) Filed: Sep. 12, 2018

(65) Prior Publication Data

US 2020/0082078 A1 Mar. 12, 2020

(51) Int. Cl.
*G06F 21/56* (2013.01)
*G06F 17/18* (2006.01)
*G06F 21/57* (2013.01)

(52) U.S. Cl.
CPC .......... *G06F 21/563* (2013.01); *G06F 17/18* (2013.01); *G06F 21/565* (2013.01); *G06F 21/577* (2013.01)

(58) Field of Classification Search
CPC ...... G06F 21/563; G06F 17/18; G06F 21/565; G06F 21/577; G06F 2221/033; G06F 8/77; G06F 8/36
See application file for complete search history.

(56) References Cited

U.S. PATENT DOCUMENTS

| | | | | |
|---|---|---|---|---|
| 8,307,351 B2* | 11/2012 | Weigert | ................ | G06F 21/16 717/141 |
| 8,434,054 B2* | 4/2013 | Wagner | ................ | G06F 8/71 717/101 |
| 9,031,922 B2* | 5/2015 | Andrew | ................ | G06F 8/71 707/698 |
| 9,223,961 B1* | 12/2015 | Sokolov | ................ | G06F 21/51 |
| 9,594,754 B2* | 3/2017 | Gounares | ................ | G06F 11/3616 |
| 10,055,576 B2* | 8/2018 | Milner | ................ | G06F 21/564 |
| 10,872,196 B2* | 12/2020 | Hunt | ................ | H04L 9/3239 |
| 2006/0230288 A1* | 10/2006 | Fox | ................ | G06F 21/563 713/188 |
| 2012/0072968 A1* | 3/2012 | Wysopal | ................ | G06F 11/3612 726/1 |
| 2013/0311496 A1* | 11/2013 | Fedorenko | ................ | G06F 8/71 707/758 |
| 2018/0060224 A1 | 3/2018 | Shavro | | |
| 2018/0129812 A1* | 5/2018 | Kang | ................ | G06F 21/566 |
| 2018/0157486 A1* | 6/2018 | Bezzi | ................ | G06F 8/71 |
| 2018/0253558 A1 | 9/2018 | Li | | |
| 2018/0285426 A1* | 10/2018 | Chow | ................ | G06F 16/248 |

OTHER PUBLICATIONS

International Search Report and Written Opinion of International Searching Authority in PCT/EP2019/074209 dated Dec. 13, 2019, 13 pages.

* cited by examiner

*Primary Examiner* — Samson B Lemma
*Assistant Examiner* — Abdullah Almamun
(74) *Attorney, Agent, or Firm* — Blackberry Limited

(57) ABSTRACT

A computer includes a memory and a processor programmed to execute instructions stored in the memory. The instructions include filtering dependency code from a binary file to separate the dependency code from custom code in the binary file. The instructions further include evaluating the custom code in the binary file for a security risk.

16 Claims, 2 Drawing Sheets

BINARY SOFTWARE COMPOSITION ANALYSIS

BACKGROUND

A binary file is a type of computer file in a computer-readable format. Rather than store data as text, a binary file stores data as a string of binary digits, such as a sequence of bytes. Computer code, in human-readable format, can be compiled into a binary file so the computer code can be executed by the computer. While not typically stored in a human-readable format, the data in a binary file can be represented as text in formats such as hexadecimal, decimal, binary, ASCII, etc.

DETAILED DESCRIPTION

Figure 1:
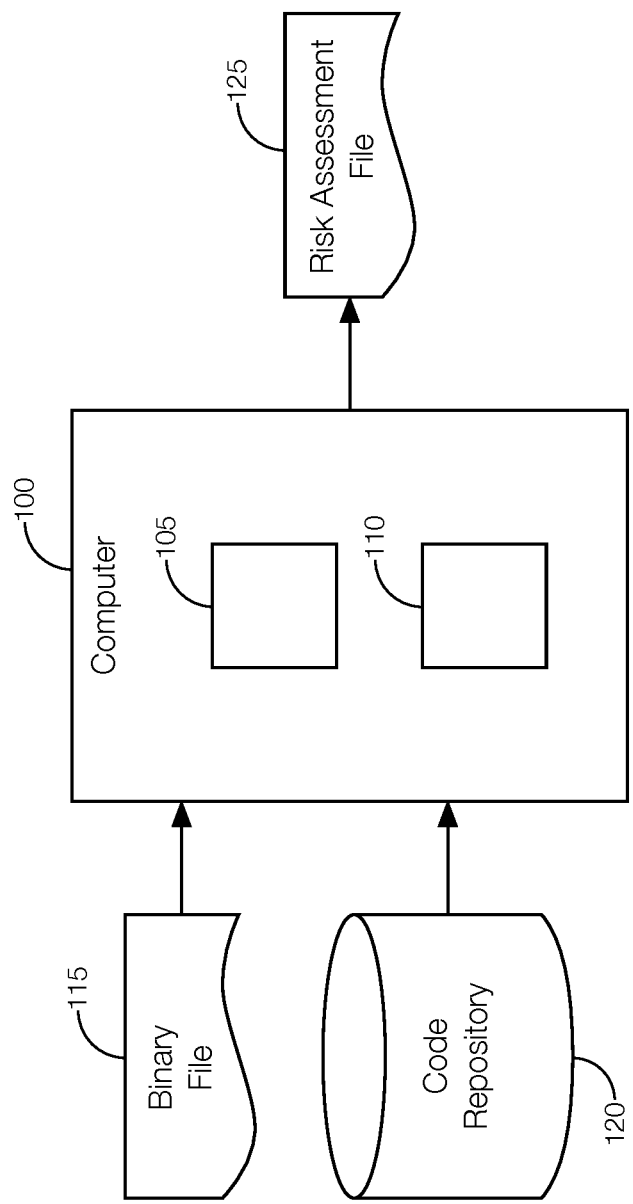
FIG. 1 illustrates an example computer programmed to evaluate binary files for security risks.

Computer applications can contain or otherwise depend on software from different sources. For example, besides the developer of the computer application, the software contained in or otherwise used by the computer application may come from a third party, the open source community, etc. As such, computer applications may contain a combination of custom code (i.e., code developed for the computer application) and dependency code (i.e., code in a code repository that is relied upon by the custom code).

Binary files can be broken down at a high level to separate the custom code from the dependency code. By performing a number of signature checks on metadata and manifests, and by performing binary static analysis checks, the reuse of certain components can be determined. These component details can be referenced against code repositories to determine the size of the library. The amount of custom code in the binary file can be calculated by subtracting the number bytes attributed to the dependency code from the total number of bytes of the binary file.

Separating custom code from the dependency code provides helpful information. For example, separating the custom code from the dependency code can indicate the size or number of libraries a computer application needs to function properly. Further, the size of the custom code in the computer application can help determine how much computing power will be necessary to analyze the binary file associated with the custom code for security risk. Further, for a given binary file, the attack surface (i.e., the amount of code exposed to a security risk) can be more accurately predicted by separating the dependency code from the custom code.

One way to separate the custom code from the dependency code is to index repositories, such as third party repositories and open source repositories. The index may then contain an extensive overview of software components likely to be used as dependency code in a computer application. A signature may be generated for each software component, and the binary file may be scanned for known fingerprints. Identifying a fingerprint in a binary file may indicate that the software component associated with the fingerprint is included in the computer application. After software components have been identified via their respective fingerprints, statistics may be developed relative to the overall size of the binary file. The statistics may represent the overall composition of the computer application. The software components associated with the identified fingerprints can be filtered from the binary file so that only the custom code remains. The portions of the binary file relating to the custom code can then be subjected to a security evaluation.

This approach may reduce the amount of time needed to assess a binary file for security risks since the approach focuses on the custom code as opposed to the dependency code, which can be evaluated separately, such before using the dependency code with the custom code.

An example computer that can separate custom code from dependency code includes a memory and a processor programmed to execute instructions stored in the memory. The instructions include filtering dependency code from a binary file to separate the dependency code from custom code in the binary file. The instructions further include evaluating the custom code in the binary file for a security risk. As such, only the custom code, and not the dependency code, in the binary file is evaluated for the security risk.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a computer 100 includes a memory 105 and a processor 110. The computer 100 receives a binary file 115 and data from a code repository 120, processes the binary file 115 in accordance with the data stored in the code repository 120, and outputs a risk assessment file 125 including metrics representing the vulnerability of the binary file 115. The metrics in the risk assessment file 125 output by the computer 100 represent the security risk posed by the binary file 115.

The memory 105 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 105 may store instructions executable by the processor 110 and data such as binary files 115, the code repository 120, and the risk assessment file 125. The binary file 115 (or "binary") is a computer-readable file including data. The binary file 115 is created by compiling human-readable computer code, such as computer code written in programming languages such as C, C++, Java, etc., in a computer-readable format. The code repository 120 is a software file including electronic data representing code dependencies from, e.g., APIs, software libraries, etc. The risk assessment file 125 is a software file that includes data representing metrics associated with the security risk posed by the binary file 115.

The processor 110 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 110 is programmed to access data stored in the memory 105, process the data, and generate data that can be stored in the memory 105, displayed on a computer monitor, transmitted to another computer or mobile device, etc.

The processor 110 is programmed to receive the binary file 115, identify custom code and dependency code in the binary file 115, separate the custom code from the dependency code, and analyze the custom code for security risks. "Custom code" refers to code developed for the particular computer application represented by the binary file 115. The "dependency code" may refer to code from a code repository 120 that is relied upon by the custom code. The dependency code may be developed by a third party (e.g., a party other than the developer of the custom code), the open source community, etc. In some instances, the term "custom code" may refer to the code in the binary file 115 that is not dependency code.

The processor 110 may be programmed to separate the custom code from the dependency code. The processor 110 may identify custom code and dependency code by performing a number of signature checks on metadata and manifests, by performing binary static analysis checks, etc., on the binary file 115 relative to code that appears in one or more code repository 120. That is, the processor 110 may be programmed to use those or other techniques to identify which parts of the binary file 115 appear in a code repository 120 and which parts do not. The processor 110 may be programmed to identify the instances of code in the binary file 115 that appear in the code repository 120 as dependency code and the instances of code in the binary file 115 that do not appear in the code repository 120 as custom code.

In some instances, the processor 110 may be further programmed to determine the size of the dependency code, the custom code, or both, based on, e.g., data in the code repository 120. For instance, the size of the dependency code can be determined from the data stored in the code repository 120, and the processor 110 may be programmed to calculate the size of the custom code in the binary file 115 by subtracting the number bytes attributed to the dependency code from the total number of bytes of the binary file 115.

The processor 110 may be programmed to determine the size of number of libraries the custom code uses for the computer application to function properly based on, e.g., the size of the custom code relative to the size of the dependency code in the binary file 115. Further, the processor 110 may be programmed to calculate how much computing power is needed for the processor 110 to analyze the entire binary file 115, the custom code, the dependency code, etc., for security risk. In some instances, the processor 110 may be programmed to calculate the size of the attack surface of the binary file 115. The attack surface may refer to the amount of code exposed to a security risk. For example, the processor 110 may be programmed to determine the size of the attack surface from, e.g., the size of the custom code. In some possible implementations, the size of the attack surface may be equal to the size of the custom code. Put another way, the processor 110 is programmed to calculate the size of the custom code, and therefore predict the size of the attack surface, by separating the dependency code from the custom code in the binary file 115.

The processor 110 may be programmed to index the code repository 120. While a single code repository 120 is shown in FIG. 1, the code repository 120 may represent any number of code repositories which could include code repositories from the developer of the computer application, third party code repositories, and open source repositories. The index may serve as a list of software components available to be used as dependency code in the computer application. As such, the index may provide a list of dependency code components that the processor 110 can search for in the binary file 115. In one instance, the processor 110 may be programmed to generate a signature (sometimes called a "fingerprint") for each instance of dependency code listed in the index. The fingerprint may be developed as a function of a version of the dependency code that has already been subjected to and passed a security evaluation. Thus, if the dependency code has changed since it was subject to the security evaluation, the fingerprint of the dependency code appearing in the binary file 115 (referred to as "altered dependency code") will not match the fingerprint of the dependency code as it was when the dependency code passed the security evaluation. In that instance, as explained in greater detail below, the processor 110 will identify and treat the altered dependency code as custom code so that the altered dependency code can be subject to additional security evaluation.

The processor 110 may be programmed to scan the binary file 115 for fingerprints representing blocks of dependency code listed in the index. The processor 110 may be programmed to determine that a particular instance of dependency code listed in the index appears in the binary file 115, and therefore in the computer application, as a result of determining that the fingerprint associated with that particular instance of dependency code is found when scanning the binary file 115. The processor 110 may identify multiple instances of dependency code, listed in the index, in the binary file 115 by matching multiple fingerprints to what appears in the binary file 115.

The processor 110 may be programmed to develop statistics associated with the instances of dependency code found in the binary file 115. The processor 110 may develop the statistics after completing the scan of the binary file 115 in accordance with the fingerprints associated with each instance of dependency code. The statistics developed by the processor 110 may represent the overall composition of the computer application. That is, the statistics may indicate the size of the dependency code, custom code, or both, relative to the overall size of the binary file 115.

The processor 110 may be programmed to filter the dependency code, as identified by their respective fingerprints, from the binary file 115. Filtering the dependency code may include removing the dependency code from the binary file 115 or otherwise marking the dependency code in a way that indicates that the sections of the binary file 115 dedicated to dependency code should be skipped during a security evaluation of the custom code. Thus, after filtering the instances of dependency code, only custom code remains or is otherwise available for security evaluation. The processor 110 may be programmed to perform a security evaluation on the custom code. The processor 110 may be programmed to output the risk assessment file 125 that includes the results of the security evaluation. The risk assessment file 125 may, in some instances, further or alternatively include the statistics discussed above.

With this approach, the processor 110 may reduce the amount of time needed to assess a binary file 115 for security risks since the processor 110 is programmed to focus the security evaluation on the custom code as opposed to all the code appearing in the binary file 115. As explained above, the dependency code may be evaluated separately, such before the dependency code is used with the custom code. In some possible approaches, the dependency code may be required to pass security checks before it can be used in combination with custom code in the computer application.

By searching for and filtering dependency code based on the fingerprint of the cleared dependency code (i.e., dependency code that has already passed a security evaluation), altered dependency code will not be mistaken for cleared dependency code since altered dependency code will have a different fingerprint than cleared dependency code. The processor 110, therefore, will treat altered dependency code as custom code subject to security evaluation.

Figure 2:
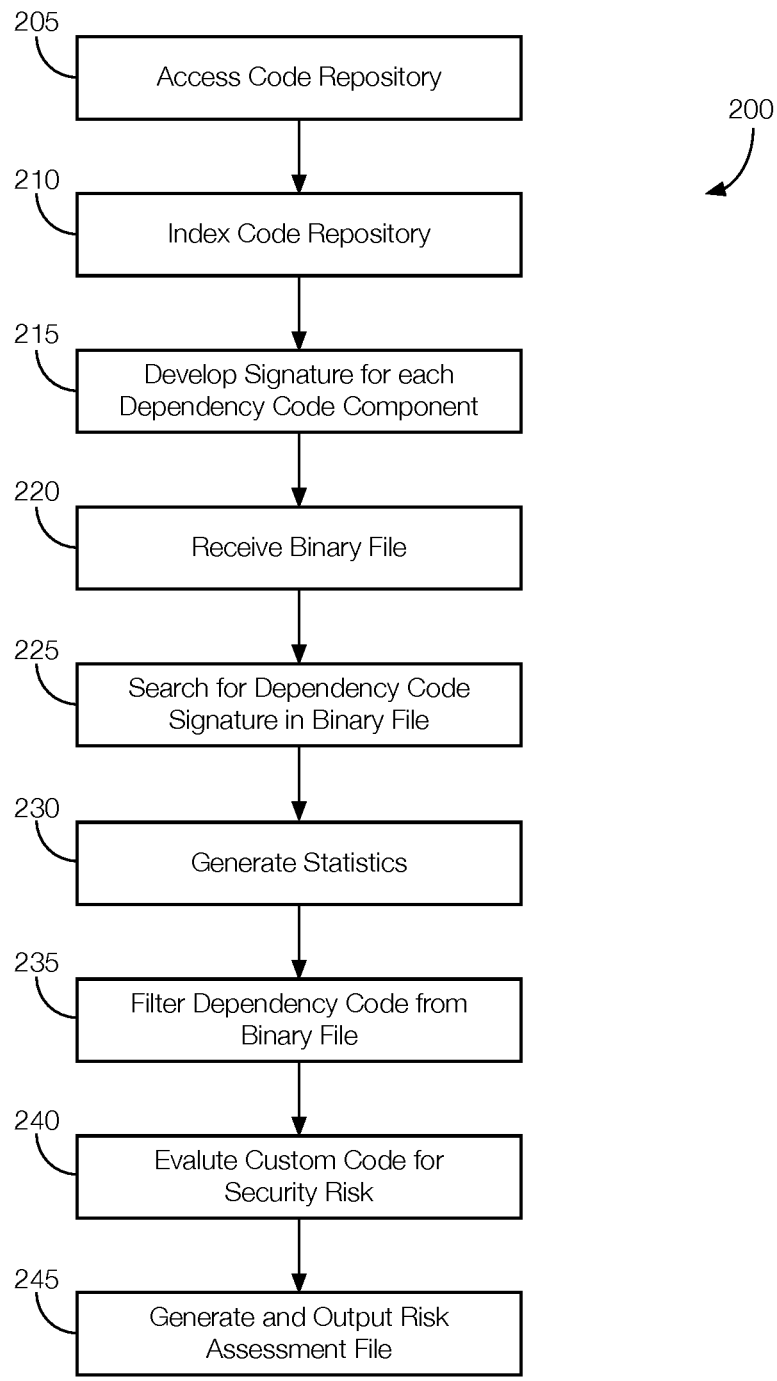
FIG. 2 is a flowchart of an example process that may be executed by the computer to evaluate binary files for security risk.

FIG. 2 is a flowchart of an example process 200 that may be implemented by the computer 100 of FIG. 1. For instance, the process 200 may be executed by the processor 110. The process 200 may begin any time the computer 100 is operating. The process 200 may begin, for instance, after the computer 100 receives a binary file 115 and has access to the code repository 120. The process 200 may continue to execute until, e.g., the processor 110 has completed its security evaluation of the binary file 115.

At block 205, the computer 100 accesses a code repository 120. The processor 110 may be programmed to access the code repository 120 by retrieving the code repository 120 from the memory 105, by accessing the code repository 120 from a remote server via a network connection, or the like. Further, at block 205, the processor 110 may be programmed to access any number of code repositories 120. If received from a remote source, the processor 110 may be programmed to store at least portions of the accessed code repositories 120 in the memory 105.

At block 210, the computer 100 indexes the code repository 120. That is, the processor 110 may index the code repository 120 accessed at block 205. In some instances, the processor 110 may index multiple code repositories 120.

At block 215, the computer 100 develops a signature (i.e., a fingerprint) for each dependency code component in the code repository 120. That is, the processor 110 may be programmed to develop the fingerprint as a function of the dependency code as it appears in the code repository 120. That way, if the dependency code changes to, e.g., altered dependency code, the fingerprint of the original (or cleared) dependency code will not match that of the altered dependency code.

At block 220, the computer 100 receives a binary file 115. As explained above, the binary file 115 is a computer-readable file including data. The binary file 115 is created by compiling human-readable computer code, such as computer code written in programming languages such as C, C++, Java, etc., in a computer-readable format. The processor 110 may receive the binary file 115 after it is provided to or generated by the computer 100, and the processor 110 may execute instructions to store the binary file 115 in the memory 105. In some instances, the processor 110 may execute instructions to generate the binary file 115 by, e.g., compiling computer code already stored in the memory 105. In other instances, the binary file 115 may be received at the computer 100 via, e.g., a wired or wireless network, a memory storage device (e.g., a flash drive), etc.

At block 225, the computer 100 searches the binary file 115 for dependency code. The processor 110, for example, may search the binary file 115 for the fingerprints of the dependency code that appears in the index of code repositories 120. The processor 110 may be programmed to determine that a particular instance of dependency code listed in the index appears in the binary file 115, and therefore in the computer application, as a result of determining that the fingerprint associated with that particular instance of dependency code is found when scanning the binary file 115. The processor 110 may identify multiple instances of dependency code, listed in the index, in the binary file 115 by matching multiple fingerprints to what appears in the binary file 115.

At block 230, the computer 100 generates statistics. As explained above, the statistics may be associated with the instances of dependency code found in the binary file 115. The processor 110 may develop the statistics after completing the scan of the binary file 115 in accordance with the fingerprints associated with each instance of dependency code. The statistics developed by the processor 110 may represent the overall composition of the computer application. That is, the statistics may indicate the size of the dependency code, custom code, or both, relative to the overall size of the binary file 115.

At block 235, the computer 100 filters the dependency code from the binary file 115. For instance, the processor 110 may remove the dependency code from the binary file 115 or otherwise mark the sections of the dependency code as such so that the dependency code will be skipped during the security evaluation of the custom code. Thus, practically speaking, after filtering the instances of dependency code, only custom code remains or is otherwise available for security evaluation.

At block 240, the computer 100 evaluates the custom code for security risk. That is, the processor 110 may be programmed to perform a security evaluation on the custom code. As discussed above, because altered dependency code will not have the same fingerprint as cleared dependency code (i.e., dependency code that has already passed a security evaluation), the altered dependency code may be treated as custom code for purposes of the security evaluation at block 240. To determine the security risk, the processor 110 may evaluate characteristics of the custom code in the binary file 115, data stored in a common vulnerability exposure (CVE) database, or both. The CVE database is a software file including electronic data representing known security vulnerabilities associated with using certain APIs, software libraries, etc. With regard to the characteristics, the processor 110 may be programmed to evaluate the code size, data size, the number of insecure application programming interfaces (APIs), the number of conditional statements, the cyclomatic complexity of the binary file 115, among other factors. A large code size has a larger attack surface, which suggests a higher likelihood of a security vulnerability. For data size, the number of constants and variables referenced by a function can indicate how much data processing will take place. More data processing may indicate greater exposure to security risks. The number of insecure APIs can indicate the risk for vulnerability based on, e.g., the number of processing strings, memory usage, and inputs/outputs used by the insecure API. Insight into the number of conditions or decisions that are being made can also indicate the security risk since, e.g., more conditions or decisions can indicate a higher security risk. Moreover, because cyclomatic complexity is a quantitative software metric that can be used to indicate the complexity of a program based on, e.g., the number of linearly independent paths through a program's source code, a greater cyclomatic complexity can represent a greater likelihood of a security vulnerability in a binary file 115. The processor 110 may consider these characteristics and the data stored in the CVE database to determine the vulnerability of the binary file 115 to a security risk.

At block 245, the computer 100 generates the risk assessment file 125. The risk assessment file 125 is a software file that includes data representing metrics associated with the security risk posed by the binary file 115, and in particular, the custom code (which as explained above may include altered dependency code). Further, in some instances, the risk assessment file 125 may further include the statistics developed at block 230. The processor 110 may generate the risk assessment file 125 according to the security risk posed by the custom code in the binary file 115 in view of the characteristics, the data from the CVE database, or a combination of both. That is, the processor 110 may determine metrics defining how vulnerable the custom code in the binary file 115 is to a security threat. The processor 110 may generate the risk assessment file 125 to reflect the metrics, the vulnerability of the binary file 115 to a security threat, or both. Further, in some instances, generating the risk assessment file 125 may include the processor 110 storing the metrics and risk assessment file 125 in the memory 105, displaying the metrics, outputting the risk assessment file 125, etc. Outputting the risk assessment file 125 may include the processor 110 executing instructions to electronically transmit the risk assessment file 125 via a wired or wireless network, store the risk assessment file 125 to a memory storage device (such as a flash drive) connected to the computer 100, etc.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the MacOS, Mac OSX, and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer comprising:
    a memory; and
    a processor programmed to execute instructions stored in the memory, the instructions including:
       identifying a first version-specific fingerprint associated with a first version of a dependency code component;
       searching, within dependency code of a binary file for the first version of the dependency code component based on the first version-specific fingerprint, wherein the dependency code of the binary file contains a second version of the dependency code component, wherein a second version-specific fingerprint associated with the second version of the dependency code component differs from the first version-specific fingerprint;
       filtering cleared dependency code from the dependency code of the binary file to separate the cleared dependency code from custom code and altered dependency code in the dependency code of the binary file, wherein the cleared dependency code is code that has already passed a security evaluation, wherein the altered dependency code includes the second version of the dependency code component; and
       evaluating the custom code and the altered dependency code in the dependency code of the binary file for a security risk.

2. The computer of claim 1, wherein the instructions include receiving a code repository representing at least one instance of dependency code.

3. The computer of claim 2, wherein the instructions include indexing the code repository.

4. The computer of claim 2, wherein the instructions include developing a version-specific fingerprint for each instance of dependency code in the code repository.

5. The computer of claim 4, wherein each version-specific fingerprint developed is a function of one of the instances of dependency code in the code repository.

6. The computer of claim 1, wherein filtering the cleared dependency code includes removing the cleared dependency code from the binary file.

7. The computer of claim 1, wherein the instructions include receiving the binary file.

8. The computer of claim 1, wherein the instructions include generating statistics representing an amount of dependency code and an amount of custom code in the binary file.

9. The computer of claim 1, wherein the instructions include generating a risk assessment file as a result of performing the security evaluation of the custom code and the altered dependency code.

10. A method implemented by a processor and memory, the method comprising:
    receiving a binary file;
    identifying a first version-specific fingerprint associated with a first version of a dependency code component;
    searching, within dependency code of the binary file, for the first version of the dependency code component based on the first version-specific fingerprint, wherein the binary file contains a second version of the dependency code component, wherein a second version-specific fingerprint associated with the second version of the dependency code component differs from the first version-specific fingerprint;
    filtering cleared dependency code from the dependency code of the binary file to separate the cleared dependency code from custom code and altered dependency code in the dependency code of the binary file, wherein the cleared dependency code is code that has already passed a security evaluation, wherein the altered dependency code includes the second version of the dependency code component; and
    evaluating, by the processor, the custom code and the altered dependency code in the dependency code of the binary file for a security risk.

11. The method of claim 10, further comprising receiving a code repository representing at least one instance of dependency code.

12. The method of claim 11, further comprising indexing the code repository.

13. The method of claim 11, further comprising developing a version-specific fingerprint for each instance of dependency code in the code repository, wherein each version-specific fingerprint developed is a function of one of the instances of dependency code in the code repository.

14. The method of claim 10, wherein filtering the cleared dependency code includes removing the cleared dependency code from the binary file.

15. The method of claim 10, further comprising generating statistics representing an amount of dependency code and an amount of custom code in the binary file.

16. The method of claim 10, further comprising generating a risk assessment file as a result of performing the security evaluation of the custom code and the altered dependency code.

* * * * *